United States Patent [19]

Snow et al.

[11] Patent Number: 6,098,066

[45] Date of Patent: *Aug. 1, 2000

[54] METHOD AND APPARATUS FOR SEARCHING FOR DOCUMENTS STORED WITHIN A DOCUMENT DIRECTORY HIERARCHY

[75] Inventors: William A. Snow, Redwood City; Joseph D. Mocker, Cupertino, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,995

[22] Filed: Jun. 13, 1997

[51] Int. Cl.⁷ .................................................. B06F 17/30
[52] U.S. Cl. ...................................... 707/3; 707/5; 707/10
[58] Field of Search ............................... 707/3, 5, 6, 100, 707/1, 2, 4, 10, 102, 104

[56] References Cited

U.S. PATENT DOCUMENTS

| | | | |
|---|---|---|---|
| 4,914,571 | 4/1990 | Baratz et al. | 707/10 |
| 5,162,992 | 11/1992 | Williams | 364/419 |
| 5,255,104 | 10/1993 | Kajigaya | 358/403 |
| 5,418,946 | 5/1995 | Mori | 395/600 |
| 5,442,778 | 8/1995 | Pedersen et al. | 707/5 |
| 5,463,773 | 10/1995 | Sakakibara et al. | 395/600 |
| 5,519,608 | 5/1996 | Kupiec | 364/419.08 |
| 5,537,586 | 7/1996 | Aram et al. | 707/3 |
| 5,568,640 | 10/1996 | Nishiyama et al. | 395/600 |
| 5,634,051 | 5/1997 | Thomson | 707/5 |
| 5,649,186 | 7/1997 | Ferguson | 395/610 |
| 5,696,962 | 12/1997 | Kupiec | 395/604 |
| 5,706,496 | 1/1998 | Noguchi et al. | 707/3 |
| 5,717,914 | 2/1998 | Husick et al. | 707/5 |
| 5,721,910 | 2/1998 | Unger et al. | 395/611 |
| 5,761,497 | 6/1998 | Holt et al. | 395/605 |
| 5,768,578 | 6/1998 | Kirk et al. | 707/100 |
| 5,778,372 | 7/1998 | Cordell et al. | 707/100 |
| 5,778,397 | 7/1998 | Kupiec et al. | 707/500 |
| 5,802,518 | 9/1998 | Karnev et al. | 707/9 |
| 5,809,340 | 9/1998 | Bertone et al. | 395/878 |
| 5,812,995 | 9/1998 | Sasaki et al. | 707/1 |
| 5,813,014 | 9/1998 | Gustman | 707/103 |
| 5,835,905 | 11/1998 | Pirolli et al. | 707/3 |
| 5,842,218 | 11/1998 | Robinson | 707/102 |
| 5,875,446 | 2/1999 | Brown | 707/3 |
| 5,918,240 | 6/1999 | Kupiec et al. | 707/531 |

FOREIGN PATENT DOCUMENTS 0 704 810 A1   4/1996   European Pat. Off. ........ G06F 17/30

OTHER PUBLICATIONS

Mark Brown et al., The Most Complete Reference Special Edition Using Netscape 2, Que Corp., pp. 184–211, Jan. 1995.

Bernard Banet, Fulcrum's searchServer Family: Standing Out by Fitting In, Seybold Report on Desktop Publishing, vol. 10, No. 9; http://www.seyboldseminars.com pp. 1–10, Jan. 1996.

*Primary Examiner*—John E. Breene
*Assistant Examiner*—Greta L. Robinson
*Attorney, Agent, or Firm*—D'Alessandro & Ritchie

[57] ABSTRACT

A method for searching a document directory hierarchy which partitions a user-initiated search. The document directory hierarchy comprises a plurality of document directories stored in a tree data structure. Each of the plurality of document directories corresponds to a category within a class hierarchy and stores at least one document. A user query comprising one or more search terms is accepted from an input device. If the user query includes a user-selected category, a directed search is performed. However, if the user query does not include a user-selected category, an undirected search is performed. The directed search confines the search to one of the plurality of document directories corresponding to the user-selected category, and returns relevant documents within the user-selected category. The undirected search is performed within each of the plurality of document directories within the document directory hierarchy, and returns relevant categories corresponding to document directories within the document directory hierarchy.

36 Claims, 6 Drawing Sheets

METHOD AND APPARATUS FOR SEARCHING FOR DOCUMENTS STORED WITHIN A DOCUMENT DIRECTORY HIERARCHY

BACKGROUND OF THE INVENTION

1. Field of the Invention

The embodiments of the present invention relate to a method and apparatus for searching a document directory hierarchy having classified documents according to a user query. More particularly, the embodiments of the present invention relate to a method and apparatus for performing a partitioned search within the classified documents according to the user query.

2. Background of the Invention

Information retrieval systems are used to search through large and numerous databases. Various search algorithms have been implemented to achieve the goal of efficient and accurate document retrieval. Searching for documents within a database, however, often results in a large number of documents being returned. Furthermore, such a search can often be unduly time consuming.

Yahoo!® is an information retrieval system which provides searching capabilities to Internet users at http://www.yahoo.com. However, although a user may initiate a search, Yahoo!® does not provide for a secondary, focused search, based upon the initial search. A Yahoo!® search may typically take several minutes. Moreover, the number of documents returned may be more than desired, forcing the user to wade through the documents with no indication of each document's relevancy. A need exists in the prior art for a more efficient method and apparatus for searching a database and retrieving documents from the database in response to a user query.

BRIEF DESCRIPTION OF THE INVENTION

A method and apparatus for searching a document directory hierarchy is provided which partitions a user-initiated search. The document directory hierarchy comprises a plurality of document directories stored in a tree data structure. Each of the plurality of document directories corresponds to a category within a class hierarchy and stores at least one document. A user query comprising one or more search terms is accepted from an input device. In accordance with the present invention, if the user query includes a user-selected category, a directed search is performed. However, if the user query does not include a user-selected category, an undirected search is performed. The directed search confines the search to one of the plurality of document directories corresponding to the user-selected category, and returns relevant documents within the user-selected category. The undirected search is performed within each of the plurality of document directories within the document hierarchy, and returns relevant categories corresponding to document directories within the document directory hierarchy. The user may then select appropriate categories, alter the search terms, and re-run the search, resulting in a more efficient search and returning significantly fewer documents.

BRIEF DESCRIPTION OF THE DRAWINGS

The following figures are illustrative and not intended to limit the scope of the invention.

DETAILED DESCRIPTION OF THE EMBODIMENTS OF THE INVENTION

Those of ordinary skill in the art will realize that the following description of the embodiments of the present invention is illustrative only and is not intended to be in any way limiting. Other embodiments of the invention will readily suggest themselves to such skilled persons from an examination of the within disclosure.

The embodiments of the present invention provide for automatic document classification within user-defined categories. A user can then interactively search for documents according to search terms within the user-defined categories. Documents are ranked according to relevance, and a user specified number of documents which are most relevant are returned. According to one embodiment, the present invention is made available to multiple users via a network.

While the embodiments of the present invention are of broad applicability and can be used in a variety of contexts, one embodiment is designed specifically to interface with Fulcrum, an information retrieval system designed for use by application developers. Fulcrum is available from Fulcrum Technologies, Inc., located at 785 Carling Ave, Ottawa, Canada K1S5H4, (613) 238-1761. The functions provided by Fulcrum include text search, indexing and retrieval capabilities. Indexing creates a summary of all documents within a desired directory and subdirectories. When a directory is indexed, Fulcrum creates an index comprising a document vector for each document within the selected directory. To create each document vector, each document is split into terms and a weight is associated with each of the terms. The term weights are based upon frequency of occurrence of each term within the document. The weights, therefore, are higher when a term exists multiple instances within the document.

Method for Creating a Class Hierarchy

Figure 1:
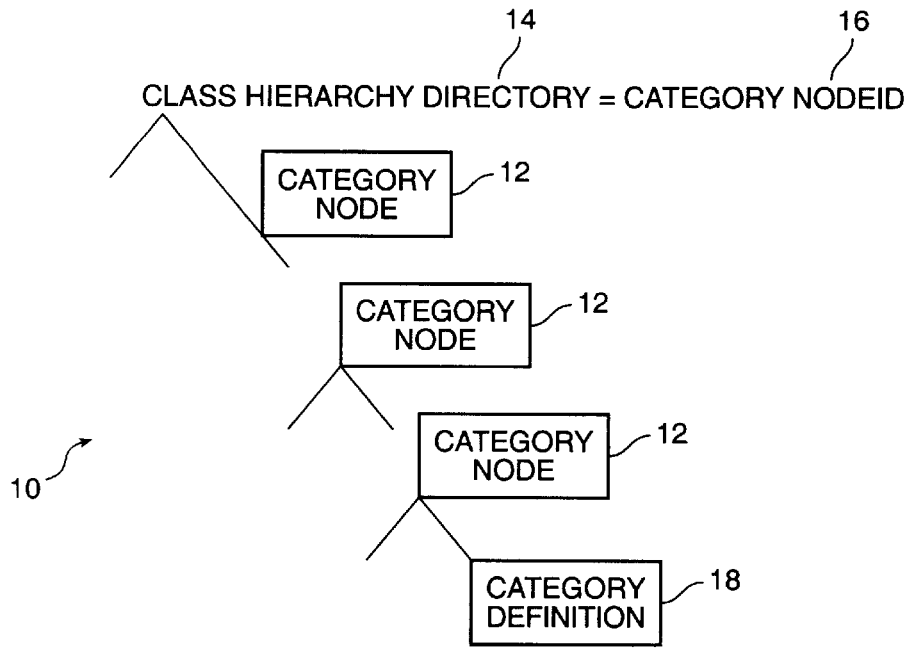
FIG. 1 illustrates a class hierarchy according to an embodiment of the present invention.

Referring now to FIG. 1, a class hierarchy 10 according to an embodiment of the present invention is shown. The class hierarchy 10 comprises at least one level of categories. These categories may further comprise sub-categories. The categories are stored in category nodes 12 within a tree data structure. According to an embodiment of the present invention, each of the category nodes 12 corresponds to a class hierarchy directory 14 equivalent to a category NodeID 16. Each category not further comprising sub-categories will herein be referred to as a leaf node, or leaf category. Each leaf category comprises a category definition 18 defining the leaf category. According to one embodiment of the present invention, the category definition 18 comprises two groups of data. The first group of data contains descriptive terms defining the corresponding leaf category. The second group of data contains portions of documents which have been classified by a user as being relevant to the leaf category. Each category further comprising subcategories is defined by the terms corresponding to all subcategories within the category. The class hierarchy 10 is stored in a class hierarchy database.

According to one embodiment of the present invention, the category node 12 includes the following fields:

Category name—The category name is used for display purposes.

Nodetype—There are three possible node types: "normal", "see" and "see also". "See also" indicates that a category node can be added at this level, but lists alternate locations in which it may also be placed. "See" indicates that a category node cannot be added at this level, and gives alternate categories in which to place the new category. "Normal" indicates that the node is either a branch or a leaf node. The nodetype is set at time of creation of the node.

NodeID—When a node is created, an integer NodeID is associated with the node. According to an embodiment of the present invention, each directory within the class hierarchy comprises a directory name equivalent to the NodeID of the corresponding category. The NodeID is used rather than the category name, since each category name may contain characters that would result in an invalid directory name.

ParentID—The ParentID field contains an integer indicating the NodeID of the parent node.

LinkID—The LinkID field is used for "see" and "see also"0 node types. The LinkID contains an integer indicating a NodeID of a desired reference node.

Entered by—The entered by field comprises a user ID entered by the user. This field provides a means for tracking system updates and creation of system errors.

One of ordinary skill in the art will recognize that the category node may comprise fewer or additional fields.

Figure 2:
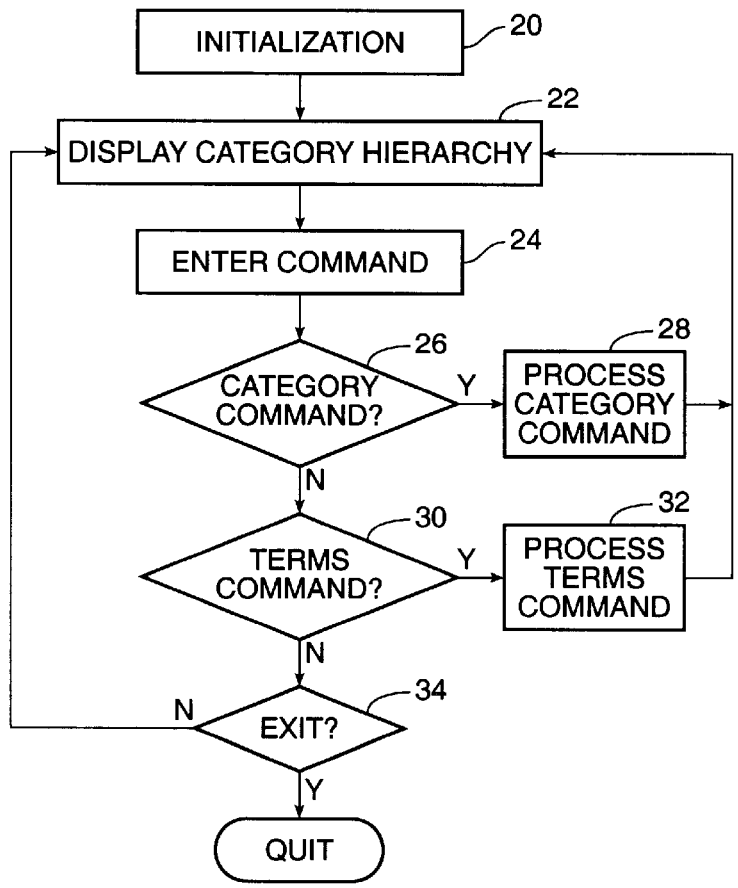
FIG. 2 is a flow diagram of the main program loop utilized in creation of the class hierarchy according to one embodiment of the present invention.

Referring now to FIG. 2, a flow diagram of the main program loop utilized in creation of the class hierarchy according to an embodiment of the present invention is shown. At step 20, initialization of the class hierarchy is performed. Initially, the class hierarchy comprises a root category, or root node. In addition, an initial set of descriptive terms, including document portions, are provided to a user. The set of initial terms and document portions are generated from various sources (i.e., keyword tables, search log files).

The class hierarchy is displayed at step 22. To display the updated class hierarchy, the class hierarchy is traversed. First, the root is found by finding the node having no parent. The NodeID of the root is then obtained. Second, it is determined whose parent is the NodeID of the root. The second step is iteratively performed with the NodeID of the current node until the LinkID indicates that the node contains no children. Since categories and terms cannot be added to a node unless a node contains only "see also" subnodes, this is indicated in the display. For example, if a node contains only "see also" subnodes, this node will be displayed to the user. However, if a node contains a subnode having a "normal" or "see" nodetype, the node will not be displayed or this limitation will otherwise be indicated to the user. Alternatively, the class hierarchy may be displayed at a later step.

Several category commands are available to create the class hierarchy. These commands include the capability to add a category node, link a first category node to a second category node, move a category node, delete a category node, edit a category node, or display information defining a category node. Manipulating nodes in a tree data structure is known in the art of software development.

At step 24, a user-selected command is entered. If the user-selected command is determined to be a category command at step 26, the appropriate category command is processed at step 28, and the routine returns to step 22. If it is determined that the user-selected command is not a category command at step 26, it is next determined whether the user-selected command is a terms command at step 30. If the user-selected command is a terms command, the appropriate terms command is processed at step 32, and the loop is repeated at step 22. The loop is repeated at step 22 until the user chooses to exit the main program loop at step 34. Alternatively, the steps 26–32 may be ordered in various ways to achieve the same result.

Figure 3:
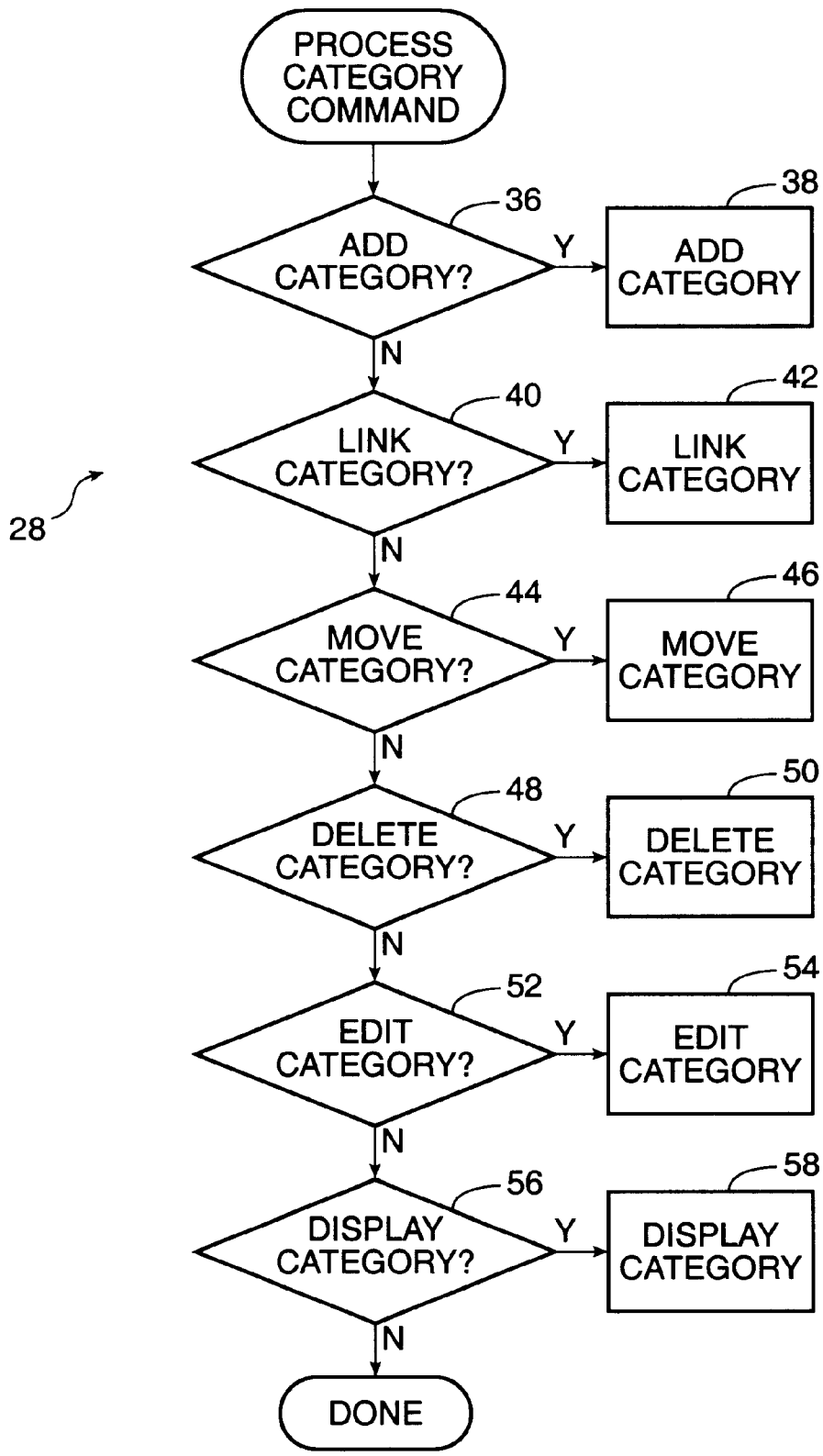
FIG. 3 is a flow diagram of the process category command procedure shown in the main program loop of FIG. 2 according to an embodiment of the present invention.

Referring now to FIG. 3, a flow diagram of the process category command procedure 28 shown in FIG. 2 according to one embodiment of the present invention is illustrated. If the user-selected command is determined to be an add category command at step 36, the add category command is performed at step 38. This command is used to add a new category by name, adding a child node to an existing category. Add is not available if the node is a leaf node or the node contains a "see" link. Add is available if a node contains only "see also" sub-nodes. The first category, or node, comprises a root directory, or 0 node. When a new category is added, a new category node is created containing a user-defined category name, a nodetype, a unique NodeID corresponding to the user-defined category name, a ParentID corresponding to a NodeID of a parent category node, a LinkID, and a UserID. This category node is then stored within the parent category node.

If the user-selected command is not an add category command, at step 40 it is determined if the user-selected command is a link category command. If the user-selected command is a link category command, the link category command is performed at step 42. The link category command allows a category to refer to another category using "see" or "see also". "See also" indicates that one or more other categories contain related information. "See" indicates that this category name cannot contain subcategories. Link is not available at the root node. Furthermore, the link command is not available if a node already contains a "see" link.

If the user-selected command is not a link-category command, at step 44 it is determined if the user-selected command is a move category command. If the user-selected command is a move category command, the move category command is performed at step 46. The move category command allows a category to be moved to another location within the class hierarchy.

If the user-selected command is not a move-category command, at step 48 it is determined if the user-selected command is a delete category command. If the user-selected command is a delete category command, the delete category command is performed at step 50. The delete category command deletes a category and any subtree. This command is not available at the root level.

If the user-selected command is not a delete category command, at step 52 it is determined if the user-selected command is an edit category command. If the user-selected command is determined to be an edit category command, the edit category command is performed at step 54. The edit category command allows a category to be renamed.

If the user-selected command is not an edit category command, at step 56 it is determined if the user-selected command is a display category command. If the user-selected command is determined to be a display category command, the display category command is performed at step 58. This command displays node information corresponding to a particular category. According to one embodiment of the present invention, ParentID and LinkID information are not displayed. If the user-selected command is not a display category command, the process category command routine is completed and the program returns to the main loop of FIG. 2. One of ordinary skill in the art will recognize that steps 36–58 may be performed in an alternate order.

According to an embodiment of the present invention, the category definition for each leaf category in the class hierarchy is stored in a terms database. The terms database comprises descriptive terms and portions of documents defining all leaf categories. Each of the descriptive terms include a reference corresponding to at least one leaf category. Similarly, each of the portions of documents include a reference corresponding to at least one leaf category, document name, type of document, fields, or portions, included within the document (i.e., synopsis), and indexing information indicating which fields, or portions, are to be extracted during indexing. Therefore, a category definition may be defined by different portions of documents depending upon the type of each document.

Figure 4:
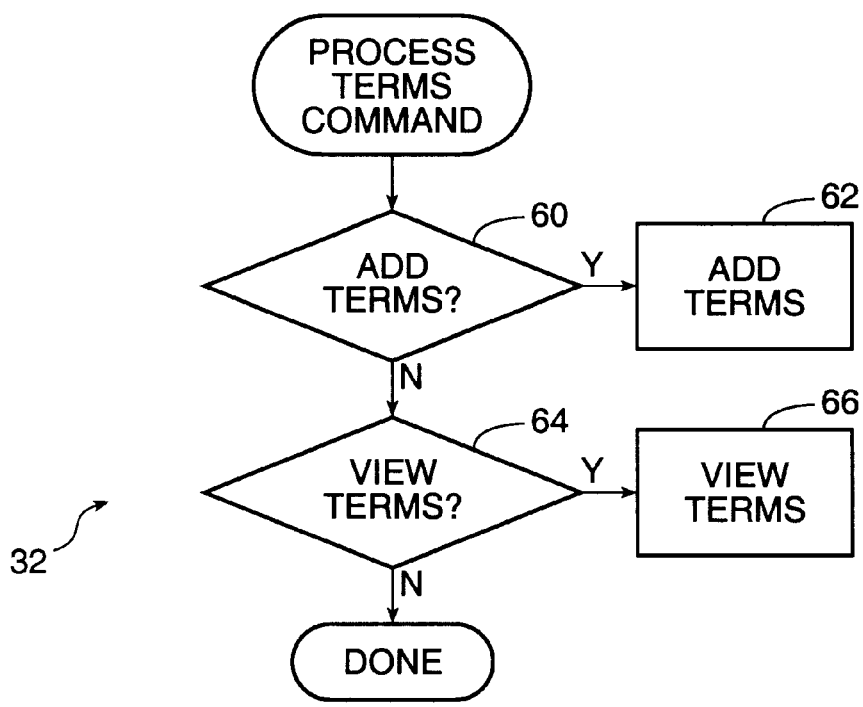
FIG. 4 is a flow diagram of the process terms command procedure shown in the main program loop of FIG. 2 according to one embodiment of the present invention.

Referring now to FIG. 4, a flow diagram of the process terms command procedure 32 shown in FIG. 2 according to an embodiment of the present invention is presented. If the user-selected command is determined at step 60 to be an add terms command, the add terms command is performed at step 62. The "add terms" command allows terms or portions of documents to be added to the category definition of a particular category. According to one embodiment of the present invention, the category must comprise a leaf category. A user can add a term from the initial set of terms, or add additional user-defined terms or document portions to an appropriate category. Multiple terms separated by commas can be entered. A confirmation dialog is presented before a term is added or deleted. Terms of a branch node may be edited if the only type of sub-nodes are "see also" links. This command provides a user with the ability to weight the descriptive terms which define a category. Terms, as well as each hand-classified document portion, can be given different weights. This is performed by creating multiple copies of a selected term or hand-classified document portion within the terms database.

If the user-selected command is not an add terms command, it is next determined if the user-selected command is a view terms command at step 64. If the user-selected command is a view terms command, the view terms command is performed at step 66. The "view terms" command allows a user to view the category definition of a particular category. This command is available only at the root node. This command is used to display all terms according to selection criteria. For example, a user may display the terms entered by anyone or display the terms entered by a user. If the user-selected command is not a view terms command, the process terms command procedure is complete and the program returns to the main loop of FIG. 2. One of ordinary skill in the art will recognize that steps 60–66 may be performed in an alternate order.

Method for Classifying a Document Within the Class Hierarchy

Once the class hierarchy has been created, documents may be classified within the class hierarchy. According to the embodiments of the present invention, a document is classified based on content within the categories within the class hierarchy. All documents entered into the system are classified within one or more categories. The disclosed method for classification results in correct placement of documents by the classifier approximately 80% of the time.

Figure 5:
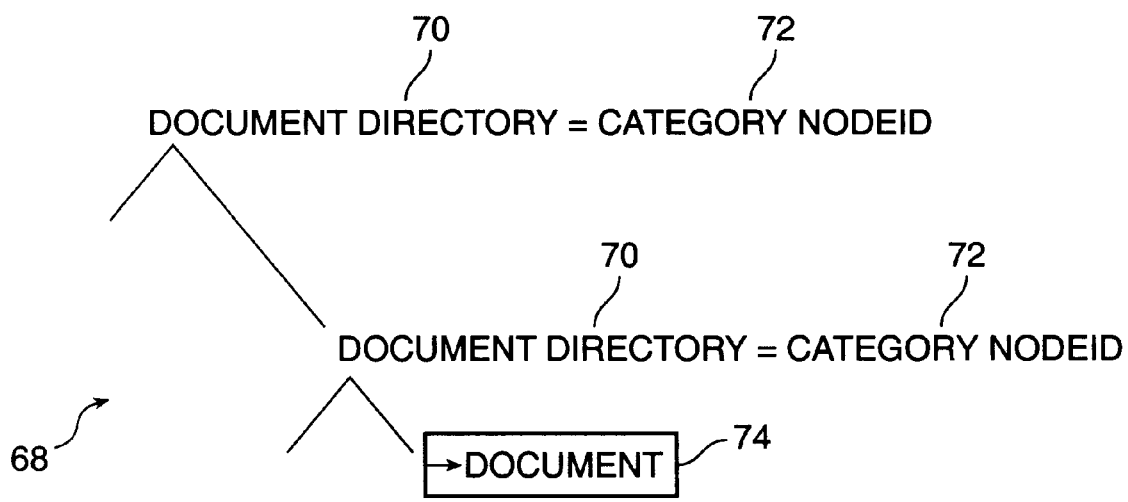
FIG. 5 illustrates a document directory hierarchy according to an embodiment of the present invention.

Referring now to FIG. 5, a document directory hierarchy 68 according to one embodiment of the present invention is shown. The document directory hierarchy 68 comprises a plurality of document directories 70. Each of the directories 70 corresponds to a category within the class hierarchy. According to one embodiment of the present invention, each of the document directories 70 is equivalent to a category NodeID 72 of the corresponding category. Once a document 74 is classified within the class hierarchy, the document 74 is stored within the document directory 68 as shown.

Figure 6:
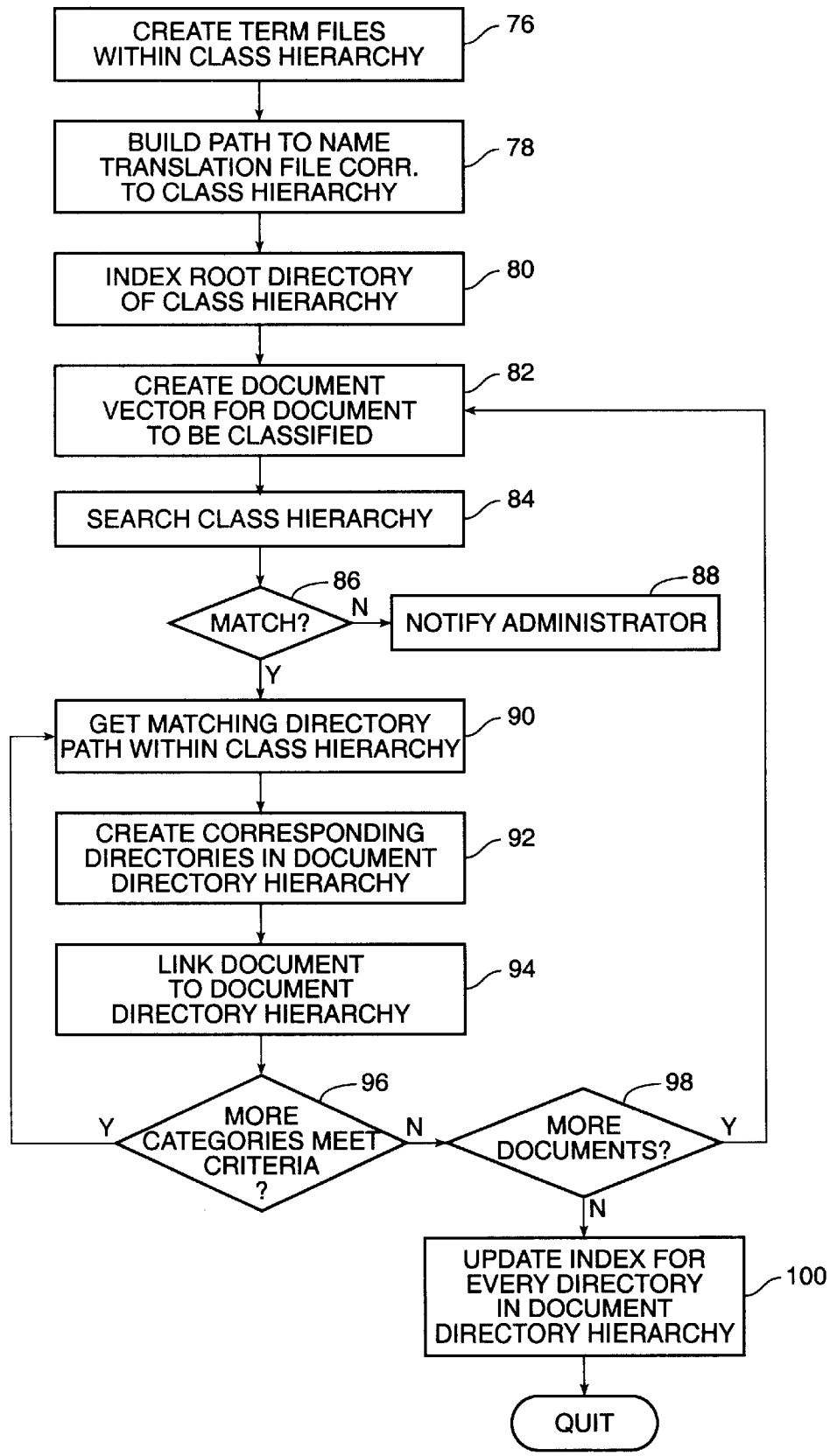
FIG. 6 is a flow diagram of the main procedure utilized in creation of the document directory hierarchy according to one embodiment of the present invention.

Referring now to FIG. 6, a flow diagram of the main procedure utilized in creation of the document directory hierarchy according to an embodiment of the present invention is shown. Initially, at step 76, a terms file is created for each category within the class hierarchy. A category definition for each leaf node is extracted from the terms database and stored in a terms file within the category directory in the class hierarchy. Therefore, each terms file will contain all terms and portions of documents defining the particular category.

Next, at step 78, a path-to-name listing containing a directory path to category name translation for each directory within the class hierarchy is created and stored in a translation file. The categories are extracted from the class hierarchy database by traversing the class hierarchy from the root, finding all the children successively until a leaf node is hit. This process is repeated for all children. Each directory within the directory hierarchy comprises a directory name equivalent to the NodeID of the corresponding category.

Next, at step 80, indexing via Fulcrum is performed. Since each leaf node initially contains only one term document, or term file, indexing is performed on the class hierarchy which contains the terms files. Fulcrum extracts the terms from each term file and weights each term according to frequency of occurrence. Traversing subdirectories is standard for the Fulcrum search engine. Fulcrum is used to index the 0 node, or root directory, which results in indexing of each subdirectory within the 0 node, creating a zero node index. Then, for each term within all term files, Fulcrum creates a term vector for each of the most common terms of the document, and corresponding positioning information. Indexing creates an index file which contains all term file document vectors.

Next, a document vector is created at step 82 for a document to be classified. The document vector is created via Fulcrum to allow classification through comparison with document vectors created in step 80.

Next, at step 84, a text search is performed within the class hierarchy to classify a document. The document to be classified is compared against all leaf node data to determine the appropriate category placement for the document. This is performed by comparing document vectors. The document vector created in step 82 is compared via Fulcrum to the term file document vectors created during the indexing step 80 to determine appropriate category placement. As a result, Fulcrum returns a relevance ranking. A top percentage of the rankings are utilized to determine appropriate categories for the document. This relevance percentage is configurable within the system. The document matches one or more categories if it meets the user-defined criteria, or configured relevance percentage. A result of the search is a list of matching category names.

At step 86, if the document does not match any of the categories, the system administrator is notified at step 88. If, however, the document meets the user-defined criteria, a matching directory path within the class hierarchy is obtained at step 90 for one of the matching category names utilizing the path-to-name translation file.

Next, any necessary directories corresponding to the matching directory path are created within the document directory hierarchy at step 92. Therefore, the directory structure within the class hierarchy will not necessarily be equivalent to that of the document directory hierarchy. As a result, only directories containing documents will be created within the document directory hierarchy. Alternatively, a directory structure equivalent to that of the class hierarchy may be created in a prior step.

Next, at step 94, the document is added to a leaf directory within the document directory hierarchy corresponding to the matching directory path. According to an embodiment of the present invention, the document is symbolically linked via Unix to the directory corresponding to the matching category.

At step 96, it is determined whether there are more matching directory paths to which the document must be linked. If there are more matching directory paths, a matching directory path for the next matching category is retrieved at step 90, and the loop is repeated.

Once the document has been linked within the document directory hierarchy, more documents may be classified by a user at step 98. When no more categories meet the user-defined criteria, more documents may be classified by a user. When all documents have been classified, each directory within the document directory hierarchy is indexed at step 100. When a branch node is indexed, all documents in sub-nodes of that node are indexed. Thus, only indexes corresponding to modified directories and the parent nodes of the modified directories will be updated. Alternatively, only modified directories and any parent nodes of the modified directories may be indexed. If there are more documents to classify at step 98, a document vector is created at step 82 and the loop is repeated.

Method for Searching the Document Directory Hierarchy

Figure 7:
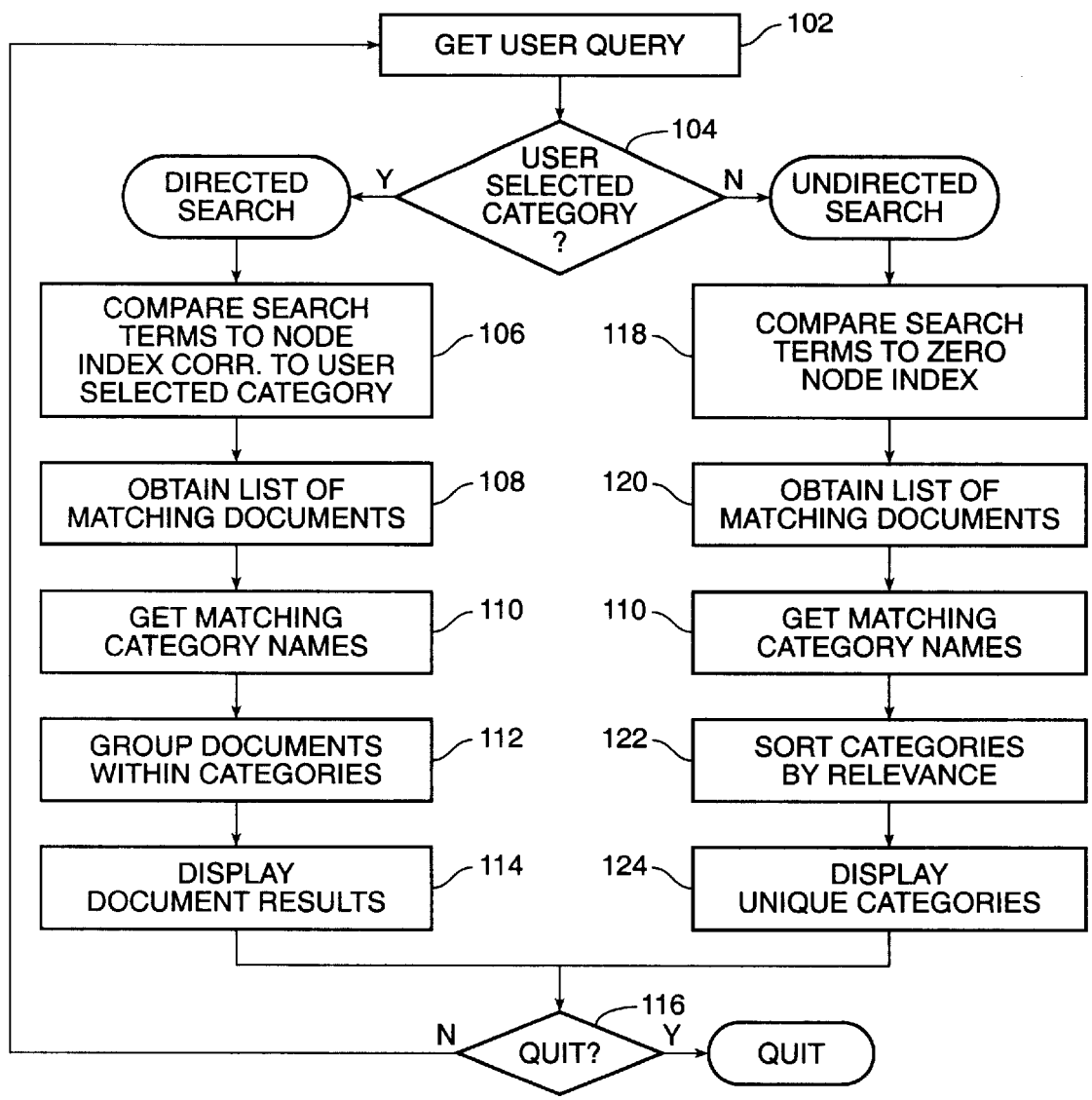
FIG. 7 is a flow diagram illustrating a method for searching the document directory hierarchy according to an embodiment of the present invention.

Referring now to FIG. 7, a flow diagram illustrating a method for searching the document directory hierarchy according to an embodiment of the present invention is shown. According to one embodiment of the present invention, two search methods are provided for searching the document directory hierarchy in response to a user query. According to a first method, an undirected search, a user query may comprise one or more search terms. In addition, after search results are obtained, the user can modify the original search terms to further limit the search. According to a second method, a directed search, a user query may comprise one or more search terms and a selected category to provide a more limited search. Once results are obtained, the user can then select one or more categories or modify the search terms to run a more limited search. According to one embodiment of the present invention, the user specifies a number of documents desired.

At step 102, a user query is obtained. The user query comprises a number of documents desired and one or more search terms. In addition, the user query may include a user selected category.

Next, at step 104, if the user query includes a user selected category, a directed search is performed. At step 106, the search terms are compared to each of the relevant document vectors created by the document indexing of the document directory hierarchy. Since the search is directed, the relevant document vectors are the document vectors within the index corresponding to the desired category.

At step 108, a list of document directory paths is obtained through Fulcrum. Each of the document directory paths includes a matching document name and a directory path corresponding to a matching document. The relevant documents are ranked according to relevance using a statistical ranking provided by Fulcrum. According to one embodiment of the present invention, the user-specified number of document directory paths which are most relevant are selected. Then, matching category names are obtained at step 110.

According to the directed search, the documents are grouped within the matching category names at step 112. Next, information corresponding to each document is displayed by category at step 114. According to an embodiment of the present invention, the document information includes a synopsis and document link. Upon completion of the directed search, a user may choose to quit at step 116. If the user does not choose to quit, the user enters another user query at step 102 and the loop is repeated.

If at step 104, if the user query does not include a user selected category, an undirected search is performed. At step 118, the search terms are compared to each of the relevant document vectors created by the document indexing of the document directory hierarchy. Since the search is undirected, the relevant document vectors are the document vectors within the zero node index.

At step 120, a list of document directory paths is obtained through Fulcrum. Each of the document directory paths includes a matching document name and a directory path corresponding to a matching document. The relevant documents are ranked according to relevance using a statistical ranking provided by Fulcrum. Then, matching category names are obtained at step 110.

According to the undirected search, all relevant category names obtained in step 110 are sorted by relevance at step 122. Duplicate category names are removed from each of the sorted relevant category names, and the unique sorted relevant category names are displayed at step 124. Upon completion of the undirected search, a user may choose to quit at step 116. If the user does not choose to quit, the user enters another user query at step 102 and the loop is repeated. Therefore, the user may select appropriate categories, alter the search terms, and re-run the search.

Figure 8:
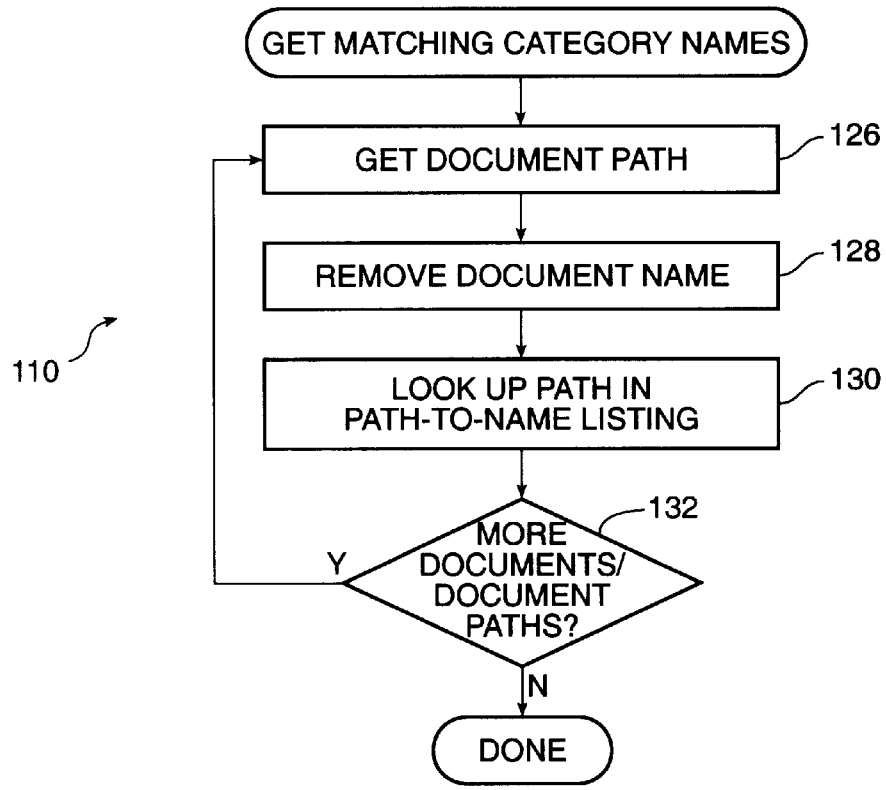
FIG. 8 illustrates a method for retrieving matching category names corresponding to directory paths shown in FIG. 7 according to an embodiment of the present invention.

Referring now to FIG. 8, the method for retrieving matching category names 110 corresponding to directory paths shown in FIG. 7 according to one embodiment of the present invention is presented. At step 126, a matching document directory path is obtained from the matching document directory paths. Next, at step 128, a document name is removed from the document directory path to obtain a directory path. Next, at step 130, a corresponding category name is obtained by performing a search, or look up, for the directory path in the path-to-name listing to obtain a category name. At step 132, if there are more matching document paths, the loop is repeated at step 126. However, if none of the matching document paths remain, each of the matching category names have been retrieved.

Figure 9:
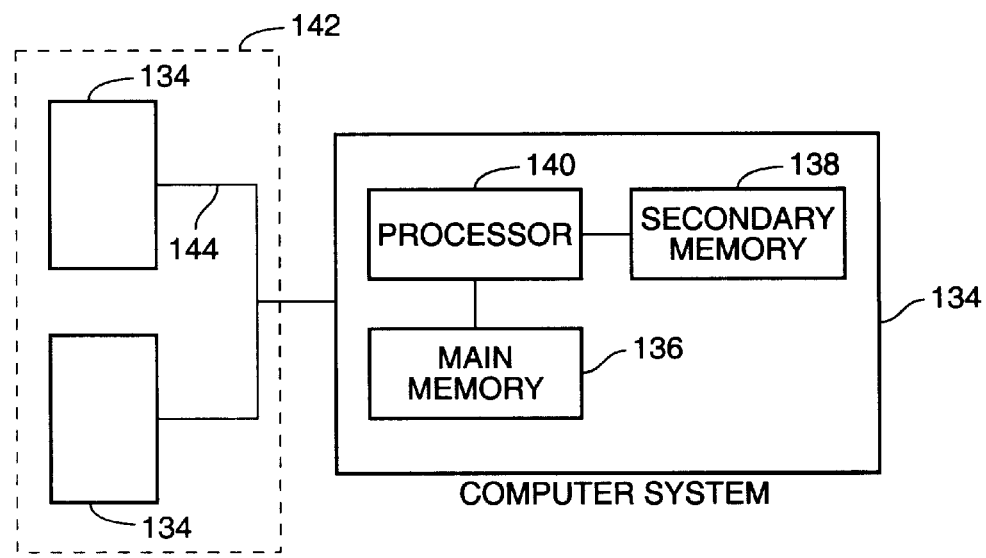
FIG. 9 illustrates a block diagram of an embodiment of a computer system implementing the present invention.

Referring now to FIG. 9, a block diagram of an embodiment of a computer system 134 implementing the present invention is shown. According to this embodiment, the present invention is stored in a main memory 136 or a secondary memory 138 of the computer system 134 for use by a processor 140. The computer system 134 may be connected to a computer network 142 through transmission lines 144. Those of ordinary skill in the art will readily recognize that the present invention may also be used in a standalone computer system, which is by definition not part of a computer network.

Alternative Embodiments

According to an alternative embodiment, the search may be performed on the index created from the terms files within the class hierarchy rather than the index created from the documents in the document directory hierarchy. Although this method is more efficient than other embodiments, it allows a category which contains no documents to be displayed to the user. Since the user may select a category which contains no documents, this may be confusing to the user.

According to another alternative embodiment, the search may be performed on the index created from the terms files within the class hierarchy in addition to the index created from the documents. This would be helpful to find related categories of information.

Although illustrative embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims in light of their full scope of equivalents.

What is claimed is:

1. A method for searching a document directory hierarchy for documents, the document directory hierarchy comprising a plurality of document directories stored in a tree data structure within a memory, each of the plurality of document directories corresponding to a category within a class hierarchy and storing at least one document, the method comprising:

accepting a user query at least one search term from an input device;

performing a directed search in response to said user query when said user query includes a user-selected category, said directed search confined to one of the plurality of document directories corresponding to said user-selected category and returning relevant documents within said user-selected category, said performing a directed search further comprising:

comparing the search terms to each of a set of document vectors created by indexing the document directory hierarchy using Fulcrum, the set of document vectors corresponding to the index of the user-selected category, said comparing producing a list of matching document directory paths, each of the document directory paths having a matching document name and a directory path corresponding to a matching document;

obtaining category names corresponding to the matching document directory paths;

grouping the matching document directory paths within the category names; and displaying information corresponding to each of the matching document directory paths; and performing an undirected search in response to said user query when said user query does not include a user-selected category, said undirected search performed within each of the plurality of document directories within the document directory hierarchy and returning relevant categories corresponding to document directories within the document directory hierarchy.

2. The method according to claim 1, wherein obtaining category names further comprises:

obtaining a matching document directory path from the matching document directory paths;

removing a document name from the matching document directory path to obtain a directory path; and extracting a category name corresponding to the directory path from a path-to-name translation listing, the path-to-name translation listing indicating relationships between document directories within the document directory hierarchy and corresponding categories within the class hierarchy.

3. The method according to claim 1, wherein each of the matching document directory paths is ranked according to relevance, the method further comprising determining a user-specified number of the matching document directory paths which are most relevant.

4. A method for searching a document directory hierarchy for documents, the document directory hierarchy comprising a plurality of document directories stored in a tree data structure within a memory, each of the plurality of document directories corresponding to a category within a class hierarchy and storing at least one document, the method comprising:

accepting a user query at least one search term from an input device;

performing a directed search in response to said user query when said user query includes a user-selected category, said directed search confined to one of the plurality of document directories corresponding to said user-selected category and returning relevant documents within said user-selected category; and performing an undirected search in response to said user query when said user query does not include a user-selected category, said undirected search performed within each of the plurality of document directories within the document directory hierarchy and returning relevant categories corresponding to document directories within the document directory hierarchy, said performing an undirected search further comprising:

comparing the search terms to each of all document vectors created by indexing the document directory hierarchy using Fulcrum, said comparing producing a list of matching document directory paths, each of the document directory paths having a matching document name and a directory path corresponding to a matching document;

obtaining category names corresponding to the matching document directory paths; and displaying the category names.

5. The method according to claim 4, wherein obtaining category names further comprises:

obtaining a matching document directory path from the matching document directory paths;

removing a document name from the matching document directory path to obtain a directory path; and extracting a category name corresponding to the directory path from a path-to-name translation listing, the path-to-name translation listing indicating relationships between document directories within the document directory hierarchy and corresponding categories within the class hierarchy.

6. The method according to claim 4, wherein each of the matching document directory paths is ranked according to relevance, said displaying further comprising:

sorting the category names by relevance; and displaying each of the category names determined to be unique.

7. A method for searching for documents within a document directory hierarchy, the method comprising:

creating a class hierarchy, the class hierarchy having a plurality of category nodes within a tree data structure, each of the plurality of category nodes having a user-defined category name and associated with a set of defining terms;

classifying a document based on content within a selected category node of the class hierarchy according to the defining terms within the class hierarchy;

storing the document in a directory within the document directory hierarchy corresponding to the selected category node; and searching the document hierarchy for documents according to a user query having one or more search terms.

8. The method according to claim 7, the user query further comprising a user-selected category corresponding to one of the plurality of category nodes.

9. A method for searching for documents within a document directory hierarchy, the method comprising:

creating a class hierarchy, the class hierarchy having a plurality of category nodes within a tree data structure, each of the plurality of category nodes having a user-defined category name and associated with a set of defining terms;

classifying a document based on content within the document directory hierarchy according to the defining terms within the class hierarchy, the document directory hierarchy having a plurality of directories, each of the plurality of directories corresponding to one of the plurality of category nodes; and searching the document hierarchy for documents according to a user query having one or more search terms.

10. A computer system for searching a document directory hierarchy for documents according to a user query having one or more search terms, the document directory hierarchy comprising a plurality of document directories stored in a tree data structure within a memory, each of the plurality of document directories corresponding to a category within a class hierarchy and storing at least one document, the computer system comprising:

a processor; and a memory having stored therein the following:

means for accepting a user query from an input device;

means for performing a directed search in response to a user query comprising a user-selected category, the directed search confined to one of the plurality of document directories corresponding to the user-selected category and returning relevant documents within the user-selected category, said means for performing a directed search further comprising:

means for comparing the search terms to each of a set of document vectors created by indexing the document directory hierarchy using Fulcrum, the set of document vectors corresponding to the index of the user-selected category, the step of comparing producing a list of matching document directory paths, each of the document directory paths having a matching document name and a directory path corresponding to a matching document;

means for obtaining category names corresponding to the matching document directory paths;

means for grouping the matching document directory paths within the category names; and means for displaying information corresponding to each of the matching document directory paths; and means for performing an undirected search in response to a user query not comprising a user-selected category, the undirected search performed within each of the plurality of document directories within the document directory hierarchy and returning relevant categories corresponding to document directories within the document directory hierarchy.

11. The computer system according to claim 10, the means for obtaining category names further comprising:

means for obtaining a matching document directory path from the matching document directory paths;

means for removing a document name from the matching document directory path to obtain a directory path; and means for extracting a category name corresponding to the directory path from a path-to-name translation listing, the path-to-name translation listing indicating relationships between document directories within the document directory hierarchy and corresponding categories within the class hierarchy.

12. The computer system according to claim 10, wherein each of the matching document directory paths is ranked according to relevance, the computer system further comprising:

means for determining a user-specified number of the matching document directory paths which are most relevant.

13. A computer system for searching a document directory hierarchy for documents according to a user query having one or more search terms, the document directory hierarchy comprising a plurality of document directories stored in a tree data structure within a memory, each of the plurality of document directories corresponding to a category within a class hierarchy and storing at least one document, the computer system comprising:

a processor; and a memory having stored therein the following:

means for accepting a user query from an input device;

means for performing a directed search in response to a user query comprising a user-selected category, the directed search confined to one of the plurality of document directories corresponding to the user-selected category and returning relevant documents within the user-selected category; and means for performing an undirected search in response to a user query not comprising a user-selected category, the undirected search performed within each of the plurality of document directories within the document directory hierarchy and returning relevant categories corresponding to document directories within the document directory hierarchy, said means for performing an undirected search further comprising:

means for comparing the search terms to each of all document vectors created by indexing the document directory hierarchy using Fulcrum, the step of comparing producing a list of matching document directory paths, each of the document directory paths having a matching document name and a directory path corresponding to a matching document;

means for obtaining category names corresponding to the matching document directory paths; and means for displaying the category names.

14. The computer system according to claim 13, the means for obtaining category names further comprising:

means for obtaining a matching document directory path from the matching document directory paths;

means for removing a document name from the matching document directory path to obtain a directory path; and means for extracting a category name corresponding to the directory path from a path-to-name translation listing, the path-to-name translation listing indicating relationships between document directories within the document directory hierarchy and corresponding categories within the class hierarchy.

15. The computer system according to claim 13, wherein each of the matching document directory paths is ranked according to relevance, the means for displaying further comprising:

means for sorting the category names by relevance; and means for displaying each of the category names determined to be unique.

16. A computer system for searching for documents within a document directory hierarchy, the computer system comprising:

a processor; and a memory having stored therein the following:

a module for creating a class hierarchy, the class hierarchy having a plurality of category nodes within a tree data structure, each of the plurality of category nodes having a user-defined category name and associated with a set of defining terms;

a module for classifying a document based on content within a selected category node of the class hierarchy according to the defining terms within the class hierarchy;

a module for storing the document in a directory within the document directory hierarchy corresponding to the selected category node; and a module for searching the document hierarchy for documents according to a user query having one or more search terms.

17. The computer system according to claim 16, the user query further comprising a user-selected category corresponding to one of the plurality of category nodes.

18. A computer system for searching for documents within a document directory hierarchy, the computer system comprising:

a processor; and a memory having stored therein the following:

a module for creating a class hierarchy, the class hierarchy having a plurality of category nodes within a tree data structure, each of the plurality of category nodes having a user-defined category name and associated with a set of defining terms;

a module for classifying a document based on content within the document directory hierarchy according to the defining terms within the class hierarchy, the document directory hierarchy having a plurality of directories, each of the plurality of directories corresponding to one of the plurality of category nodes; and a module for searching the document hierarchy for documents according to a user query having one or more search terms.

19. A computer-readable medium recording software, the software disposed on a computer to perform a method for searching a document directory hierarchy for documents according to a user query having one or more search terms, the document directory hierarchy comprising a plurality of document directories stored in a tree data structure within a memory, each of the plurality of document directories corresponding to a category within a class hierarchy and storing at least one document, the method comprising:

accepting a user query from an input device; and performing a directed search in response to a user query comprising a user-selected category and otherwise performing an undirected search, the directed search confined to one of the plurality of document directories corresponding to the user-selected category and returning relevant documents within the user-selected category, the undirected search performed within each of the plurality of document directories within the document directory hierarchy and returning relevant categories corresponding to document directories within the document directory hierarchy, said performing a directed search further comprising:

comparing the search terms to each of a set of document vectors created by indexing the document directory hierarchy using Fulcrum, the set of document vectors corresponding to the index of the user-selected category, said comparing producing a list of matching document directory paths, each of the document directory paths having a matching document name and a directory path corresponding to a matching document;

obtaining category names corresponding to the matching document directory paths;

grouping the matching document directory paths within the category names; and displaying information corresponding to each of the matching document directory paths.

20. The computer-readable medium according to claim 19, said obtaining category names further comprising:

obtaining a matching document directory path from the matching document directory paths;

removing a document name from the matching document directory path to obtain a directory path; and extracting a category name corresponding to the directory path from a path-to-name translation listing, the path-to-name translation listing indicating relationships between document directories within the document directory hierarchy and corresponding categories within the class hierarchy.

21. The computer-readable medium according to claim 19, wherein each of the matching document directory paths is ranked according to relevance, the method further comprising:

determining a user-specified number of the matching document directory paths which are most relevant.

22. A computer-readable medium recording software, the software disposed on a computer to perform a method for searching a document directory hierarchy for documents according to a user query having one or more search terms, the document directory hierarchy comprising a plurality of document directories stored in a tree data structure within a memory, each of the plurality of document directories corresponding to a category within a class hierarchy and storing at least one document, the method comprising:

accepting a user query from an input device; and performing a directed search in response to a user query comprising a user-selected category, and otherwise performing an undirected search, the directed search confined to one of the plurality of document directories corresponding to the user-selected category and returning relevant documents within the user-selected category, the undirected search performed within each of the plurality of document directories within the document directory hierarchy and returning relevant categories corresponding to document directories within the document directory hierarchy, said performing an undirected search further comprising:

comparing the search terms to each of all document vectors created by indexing the document directory hierarchy using Fulcrum, said comparing producing a list of matching document directory paths, each of the document directory paths having a matching document name and a directory path corresponding to a matching document;

obtaining category names corresponding to the matching document directory paths; and displaying the category names.

23. The computer-readable medium according to claim 22, wherein obtaining category names further comprises:

obtaining a matching document directory path from the matching document directory paths;

removing a document name from the matching document directory path to obtain a directory path; and extracting a category name corresponding to the directory path from a path-to-name translation listing, the path-to-name translation listing indicating relationships between document directories within the document directory hierarchy and corresponding categories within the class hierarchy.

24. The computer-readable medium according to claim 22, wherein each of the matching document directory paths is ranked according to relevance, said displaying further comprising:

sorting the category names by relevance; and displaying each of the category names determined to be unique.

25. A computer-readable medium recording software, the software disposed on a computer to perform a method for searching for documents within a document directory hierarchy, the method comprising:

creating a class hierarchy, the class hierarchy having a plurality of category nodes within a tree data structure, each of the plurality of category nodes having a user-defined category name and associated with a set of defining terms;

classifying a document based on content within a selected category node of the class hierarchy according to the defining terms within the class hierarchy;

storing the document in a directory within the document directory hierarchy corresponding to the selected category node; and searching the document hierarchy for documents according to a user query having one or more search terms.

26. The computer-readable medium according to claim 25, the user query further comprising a user-selected category corresponding to one of the plurality of category nodes.

27. A computer-readable medium recording software, the software disposed on a computer to perform a method for searching for documents within a document directory hierarchy, the method comprising:

creating a class hierarchy, the class hierarchy having a plurality of category nodes within a tree data structure, each of the plurality of category nodes having a user-defined category name and associated with a set of defining terms;

classifying a document based on content within the document directory hierarchy according to the defining terms within the class hierarchy, the document directory hierarchy having a plurality of directories, each of the plurality of directories corresponding to one of the plurality of category nodes; and searching the document hierarchy for documents according to a user query having one or more search terms.

28. A computer data signal embodied in a carrier wave and representing sequences of instructions which, when executed by a processor, cause said processor to search a document directory hierarchy for documents according to a user query having one or more search terms, the document directory hierarchy comprising a plurality of document directories stored in a tree data structure within a memory, each of the plurality of document directories corresponding to a category within a class hierarchy and storing at least one document, by performing the following:

accepting a user query from an input device; and performing a directed search in response to a user query comprising a user-selected category, and otherwise performing an undirected search, the directed search confined to one of the plurality of document directories corresponding to the user-selected category and returning relevant documents within the user-selected category the undirected search performed within each of the plurality of document directories within the document directory hierarchy and returning relevant categories corresponding to document directories within the document directory hierarchy, said performing a directed search further comprising:

comparing the search terms to each of a set of document vectors created by indexing the document directory hierarchy using Fulcrum, the set of document vectors corresponding to the index of the user-selected category, said comparing producing a list of matching document directory paths, each of the document directory paths having a matching document name and a directory path corresponding to a matching document;

obtaining category names corresponding to the matching document directory paths;

grouping the matching document directory paths within the category names; and displaying information corresponding to each of the matching document directory paths.

29. The computer data signal according to claim 28, said obtaining category names further comprising:

obtaining a matching document directory path from the matching document directory paths;

removing a document name from the matching document directory path to obtain a directory path; and extracting a category name corresponding to the directory path from a path-to-name translation listing, the path-to-name translation listing indicating relationships between document directories within the document directory hierarchy and corresponding categories within the class hierarchy.

30. The computer data signal according to claim 28, wherein each of the matching document directory paths is ranked according to relevance, further comprising determining a user-specified number of the matching document directory paths which are most relevant.

31. A computer data signal embodied in a carrier wave and representing sequences of instructions which, when executed by a processor, cause said processor to search a document directory hierarchy for documents according to a user query having one or more search terms, the document directory hierarchy comprising a plurality of document directories stored in a tree data structure within a memory, each of the plurality of document directories corresponding to a category within a class hierarchy and storing at least one document, by performing the following:

accepting a user query from an input device; and performing a directed search in response to a user query comprising a user-selected category, and otherwise performing an undirected search, the directed search confined to one of the plurality of document directories corresponding to the user-selected category and returning relevant documents within the user-selected category, the undirected search performed within each of the plurality of document directories within the document directory hierarchy and returning relevant categories corresponding to document directories within the document directory hierarchy, said performing an undirected search further comprising:

comparing the search terms to each of all document vectors created by indexing the document directory hierarchy using Fulcrum, said comparing producing a list of matching document directory paths, each of the document directory paths having a matching document name and a directory path corresponding to a matching document;

obtaining category names corresponding to the matching document directory paths; and displaying the category names.

32. The computer data signal according to claim 31, wherein obtaining category names further comprises:

obtaining a matching document directory path from the matching document directory paths;

removing a document name from the matching document directory path to obtain a directory path; and extracting a category name corresponding to the directory path from a path-to-name translation listing, the path-to-name translation listing indicating relationships between document directories within the document directory hierarchy and corresponding categories within the class hierarchy.

33. The computer data signal according to claim 31, wherein each of the matching document directory paths is ranked according to relevance, said displaying further comprising:

sorting the category names by relevance; and displaying each of the category names determined to be unique.

34. A computer data signal embodied in a carrier wave and representing sequences of instructions which, when executed by a processor, cause said processor to search for documents within a document directory hierarchy, by performing the following:

creating a class hierarchy, the class hierarchy having a plurality of category nodes within a tree data structure, each of the plurality of category nodes having a user-defined category name and associated with a set of defining terms;

classifying a document based on content within a selected category node of the class hierarchy according to the defining terms within the class hierarchy;

storing the document in a directory within the document directory hierarchy corresponding to the selected category node; and searching the document hierarchy for documents according to a user query having one or more search terms.

35. The computer data signal according to claim 34, the user query further comprising a user-selected category corresponding to one of the plurality of category nodes.

36. A computer data signal embodied in a carrier wave and representing sequences of instructions which, when executed by a processor, cause said processor to search for documents within a document directory hierarchy, by performing the following:

creating a class hierarchy, the class hierarchy having a plurality of category nodes within a tree data structure, each of the plurality of category nodes having a user-defined category name and associated with a set of defining terms;

classifying a document based on content within the document directory hierarchy according to the defining terms within the class hierarchy, the document directory hierarchy having a plurality of directories, each of the plurality of directories corresponding to one of the plurality of category nodes; and searching the document hierarchy for documents according to a user query having one or more search terms.

* * * * *

UNITED STATES PATENT AND TRADEMARK OFFICE
CERTIFICATE OF CORRECTION

PATENT NO. : 6,098,066  
DATED : August 1, 2000  
INVENTOR(S) : William A. Snow, Joseph D. Mocker Page 1 of 1

It is certified that error appears in the above-identified patent and that said Letters Patent is hereby corrected as shown below:

<u>Title page, Item [54], and Column 1, line 1,</u>  
Before "METHOD" insert -- A --.

<u>Column 3,</u>  
Line 36, delete "0" before "node".

<u>Column 6,</u>  
Line 48, replace "weights" with -- weighs --.

<u>Column 10,</u>  
Line 28, after "comprising" insert -- : --.  
Lines 60 & 62, indent two spaces.

Signed and Sealed this

Twenty-sixth Day of February, 2002

Attest:

JAMES E. ROGAN  
*Attesting Officer*    *Director of the United States Patent and Trademark Office*